United States Patent [19]

Stoltz

[11] 4,298,309
[45] Nov. 3, 1981

[54] PIPE CARRYING CARTS

[76] Inventor: Woodrow W. Stoltz, P.O. Box 35103, Tulsa, Okla. 74135

[21] Appl. No.: 34,476

[22] Filed: Apr. 30, 1979

[51] Int. Cl.³ .......................................... B65H 51/00
[52] U.S. Cl. .................... 414/745; 105/1 R; 410/44; 410/53
[58] Field of Search ............ 105/1 R; 414/431, 775, 414/710, 745; 410/44, 45, 53

[56] References Cited

U.S. PATENT DOCUMENTS

| | | | |
|---|---|---|---|
| 3,288,082 | 11/1966 | Brosnan | 104/2 |
| 4,142,644 | 3/1979 | Stoltz | 414/745 |

Primary Examiner—Richard A. Bertsch
Attorney, Agent, or Firm—Head & Johnson

[57] ABSTRACT

Carts or vehicles particularly designed and constructed for supporting the opposite ends of elongated members whereby one elongated member is suspended between a pair of the carts and a succeeding elongated member is suspended between a succeeding pair of carts, the carts being so arranged that the rear cart or vehicle of the leading elongated member will latch to or engage the leading vehicle of the following elongated member in such a manner that the adjacent ends of in-line elongated members will be in abutment.

3 Claims, 4 Drawing Figures

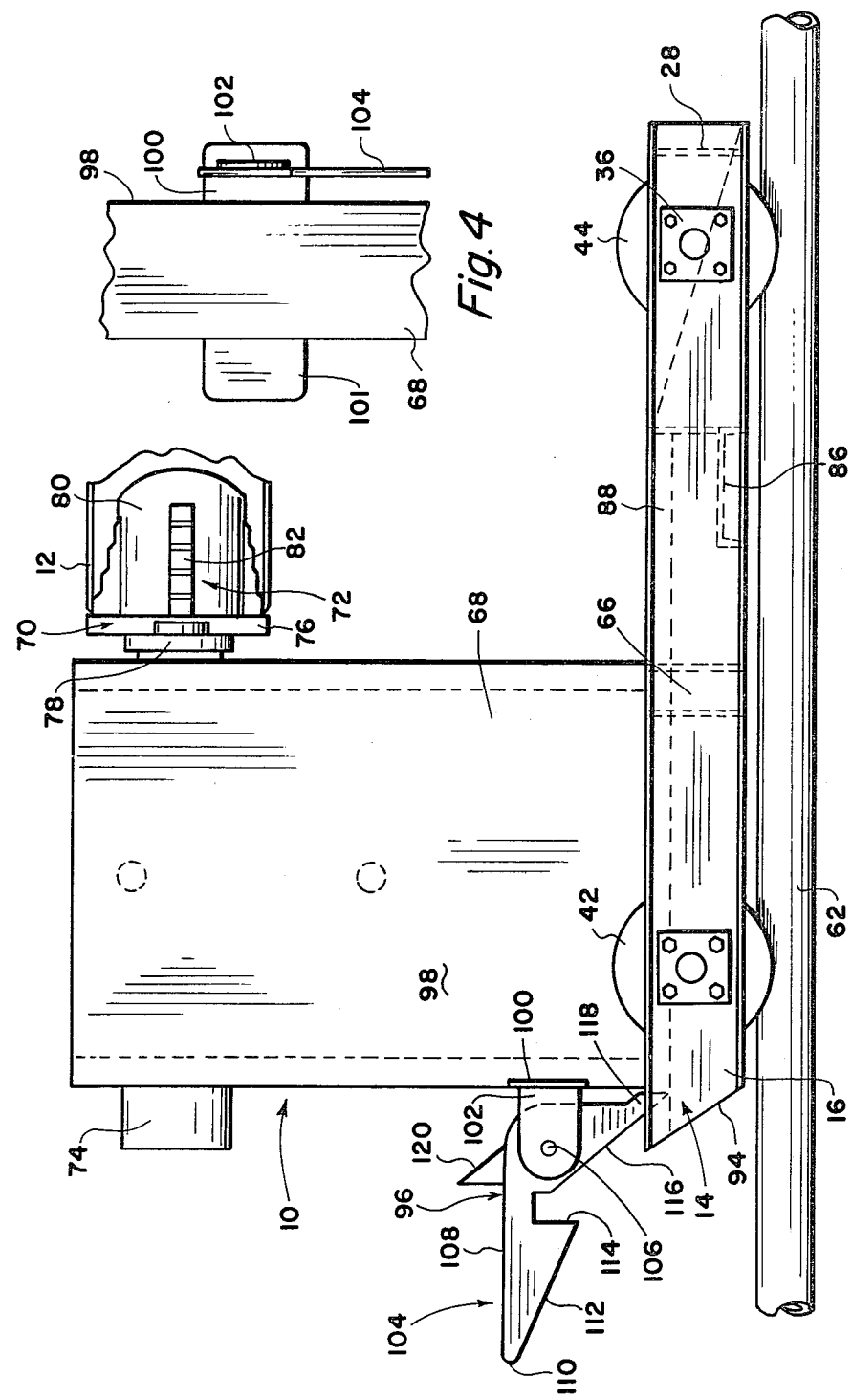

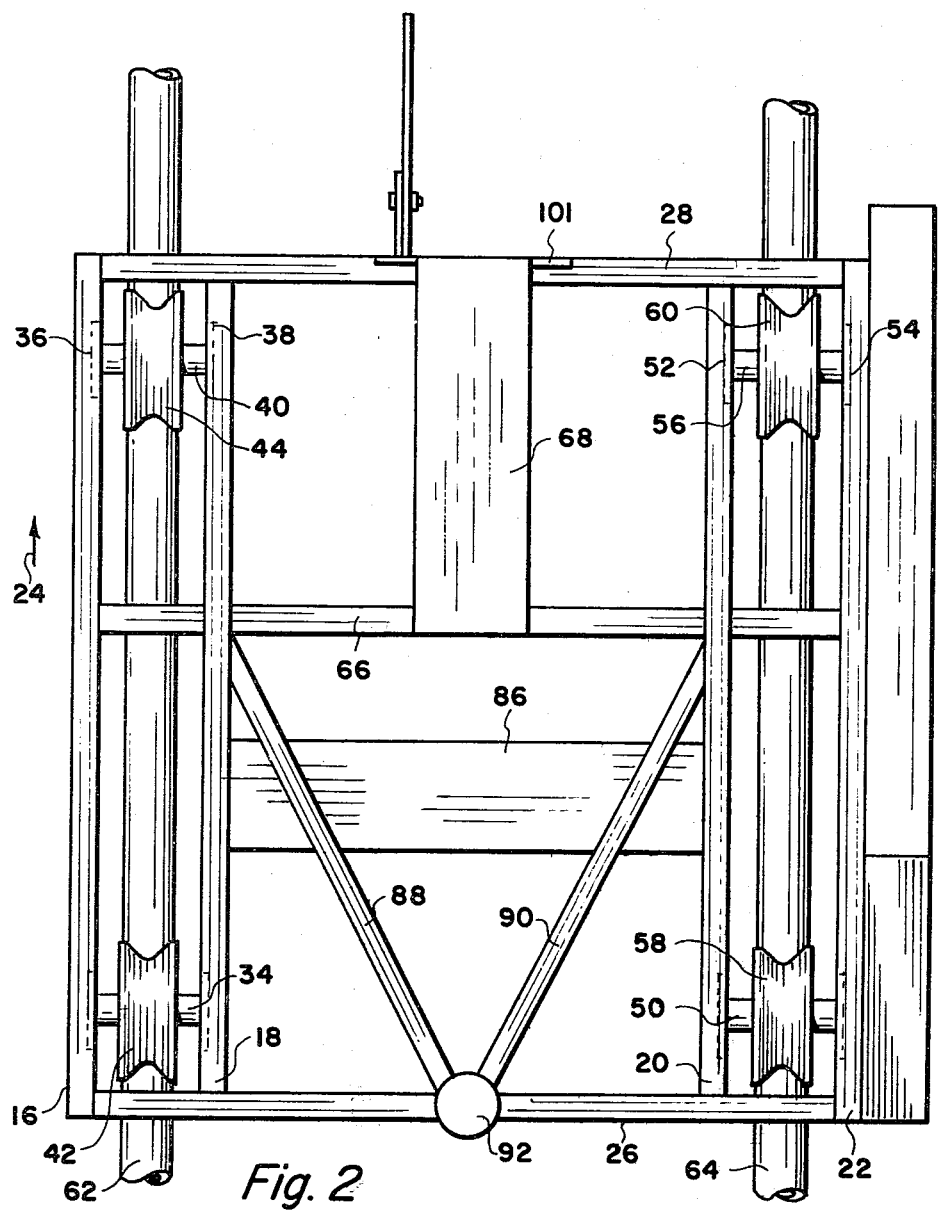
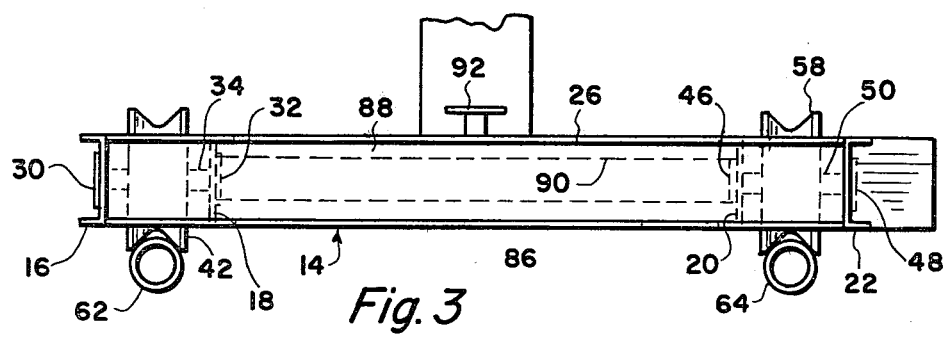

PIPE CARRYING CARTS

CROSS-REFERENCE TO RELATED PATENT

This is an improvement application of my prior application Ser. No. 820,581, filed Aug. 1, 1977, and entitled "Telescoping Vehicles", now U.S. Pat. No. 4,142,644, issued Mar. 6, 1979.

BACKGROUND OF THE INVENTION

1. Field of the Invention

This invention relates to improvements in vehicles and more particularly, but not by way of limitation, to complementary pairs of vehicles adapted for mutually latching engagement during the transporting of in-line objects.

2. Description of the Prior Art

The service life of steel pipes, and the like, is greatly increased by the application of an external coating material thereto. Steel pipe sections are normally relatively long and heavy and somewhat difficult to handle during a coating operation. In order to overcome the present day difficulties of these pipe coating operations, the system set forth in my co-pending application Ser. No. 815,910, filed July 15, 1977, and entitled "Pipe Coating System" has been developed wherein a plurality of individual pipe sections are moved sequentially through the steps required for the efficient coating operation. During many of the coating steps, the heavy pipe sections are supported by rolling or wheeled carts or vehicles which carry the pipe sections through the coating stations in such a manner that the entire outer periphery of each pipe section is thoroughly and efficiently coated.

In order to achieve the optimum coverage during the coating operation, the system set forth in my co-pending application Ser. No. 815,910, including the combined longitudinal and rotational movement of each pipe section carried by the wheeled vehicles, is used. The pipe sections are moved in a forward longitudinal direction by suitable push roller means and rotated about the longitudinal axes thereof by suitable plug means carried by the wheeled vehicles. In order to provide a more efficient movement of the individual pipe sections carried by the wheeled vehicles, it is important that the pipe sections be maintained in a substantially abutting end-to-end relation, which is difficult to achieve with presently available rolling or wheeled vehicles of this type.

SUMMARY OF THE INVENTION

The present invention contemplates complementary pairs of wheeled vehicles for supporting individual pipe sections in a suspended manner therebetween. Each vehicle is provided with an upstanding pipe-engaging plug means for insertion within the open end of the pipe section whereby the pipe section is suspended therebetween with contact at the inner periphery thereof only, thus precluding any interference with the subsequent coating operations. The plug means is suitably journalled on the respective vehicle for free rotation in order that each pipe section may be rotated about its own longitudinal axis while moving longitudinally as the vehicle is moved in the direction of the length of the pipe.

Each vehicle or cart is provided with at least two pairs of axially aligned spaced wheels with one pair of wheels being the front wheels and the other pair of said wheels being the rear wheels. The distance between the axially aligned front wheels is preferably substantially the same as the distance between the axially aligned rear wheels whereby the respective left hand and right hand wheels "track" with respect to one another. Each vehicle is provided with a pivotal latch means engageable with the corresponding latch means of the adjacent vehicle in order to interconnect succeeding vehicles whereby the adjacent pipe ends of the two sequential pipe sections may be moved into a substantially end-to-end abutting relationship without interference between the two supporting carts or vehicle.

In addition, it is important that all of the pipe sections continually rotate about the longitudinal axes thereof. In order to facilitate this rotational movement, each plug means is preferably provided with a clutch or ratchet means automatically engagable with the clutch or ratchet means of the adjacent plug means whereby the engaged or latched position between the two adjacent vehicles will interconnect the plug means thereof and any rotation of one of the individual pipe sections will be transmitted throughout all of the pipe sections in the connected sequence.

As hereinbefore set forth, and as set forth in my aforementioned co-pending application Ser. No. 815,910, the individual pipe sections are engaged by suitable push rollers for imparting a longitudinal movement to the particular pipe section disposed in engagement therewith. The longitudinal movement is imparted from the engaged pipe to all of the preceding pipe sections by virtue of the end-to-end positioning and clutching engagement of the respective plug clutch means as hereinbefore set forth. In addition, the engagement of the push roller means with the pipe section imparts a simultaneous rotational movement to the particular pipe section engaged thereby. This rotational movement is transmitted to the plug means of the rotating pipe section, and the engaged clutch means between two adjacent plug means transmits the rotation to the next preceding pipe section, and so forth, thus providing for a continuous combined rotational and longitudinal movement for the pipe sections being transported by the vehicle.

Of course, when a pipe section suspended between a pair of the novel vehicles has been completely coated, the pipe section may be released from engagement with the plug means, and the empty vehicles may be moved in a reverse direction for repeating the operation with another pipe section, as set forth in my aforementioned co-pending application Ser. No. 815,910 and and prior U.S. Pat. No. 4,142,644.

BRIEF DESCRIPTION OF THE DRAWINGS

FIG. 1 is a side elevational view of a wheeled vehicle embodying the invention.

FIG. 2 is a plan view of a wheeled vehicle embodying the invention.

FIG. 3 is an end elevational view of a wheeled vehicle embodying the invention.

FIG. 4 is a view taken on line 4—4 of FIG. 1.

DESCRIPTION OF THE PREFERRED EMBODIMENT

Referring to the drawings in detail, reference character 10 generally indicates a vehicle or cart for supporting one end of a pipe section 12 as will be hereinafter set forth. The vehicle 10 comprises a basic framework structure 14 which includes a first pair of mutually parallel spaced channel members 16 and 18 spaced from a substantially identical pair of mutually parallel spaced channel members 20 and 22, as particularly shown in FIGS. 2 and 3. Assuming the vehicle 10 moves in a direction as indicated by the arrow 24 in FIG. 2, the rear end of the channel members 16 and 18 may be rigidly secured in spaced relation with respect to each other and with respect to the channel members 20 and 22 by a suitable cross member 26. The front ends of the channels 16 and 18 may be secured in said spaced relation with respect to one another and with respect to the channels 20 and 22 by a second cross member 28. The cross members 26 and 28 preferably extend transversely across substantially the entire width of the vehicle 10, from the outboard channel 16 to the outboard channel 22. Thus, a substantially rectangular configuration is provided for the framework structure 14.

A first pair of flanges 30 and 32 are bolted or otherwise secured to the channels 16 and 18 in the proximity of the cross member 26 and in substantial alignment with suitable bores (not shown) provided in the channels whereby an axle member 34 may be supported by the flanges 30 and 32. A second pair of substantially identical flanges 36 and 38 are similarly bolted or otherwise secured to the channels 16 and 18 in the proximity of the cross member 28, whereby the flanges 36 and 38 support a second axle 40 therebetween. A first wheel 42 is suitably journalled on the axle 34, and may be considered as a rear wheel when the direction of travel of the vehicle is as indicated by the arrow 24. A second wheel 44 is suitably journalled on the axle 40, and may be considered as a front wheel for the vehicle, with the wheels 42 and 44 being disposed in substantial "tracking" relationship for a purpose as will be hereinafter set forth.

A pair of flanges 46 and 48 (FIG. 3) are bolted or otherwise secured to the channels 20 and 22 in the proximity of the cross member 26 in substantially the same manner as the flanges 30 and 32 and support an axle 50 therebetween. Another pair of flanges 52 and 54 are bolted to the channel members in the proximity of the cross member 28 for supporting an axle 56 therebetween. A wheel 58 is suitably journalled on the axle 50 and is disposed in substantial axial alignment with the wheel 42 for cooperating therewith to provide a pair of rear wheels for the vehicle 10. A wheel 60 is similarly journalled on the axle 56 and is disposed in substantial "tracking" alignment with the wheel 58 and in substantial axial alignment with the wheel 44 for cooperation therewith to provide a pair of front wheels for the vehicle 10.

The wheels 42, 44, 58 and 60 may be of any suitable type, but as shown herein, is is preferable that the wheels be of the type having a grooved outer periphery for engagement with suitable rails 62 and 64 as particularly shown in FIG. 2 for moving therealong in the manner as set forth in my aforementioned co-pending application Ser. No. 815,910 and U.S. Pat. No. 4,142,644.

An intermediate cross member 66 is secured between the channels 16–18 and 20–22 in spaced relation with respect to the cross member 28, as particularly shown in FIG. 2, and cooperates therewith for supporting a pedestal 68. The pedestal 68 is generally similar to that disclosed in my aforementioned U.S. Pat. No. 4,142,644 and is secured to the cross members 28 and 66 in any suitable manner for supporting a plug means generally indicated at 70 in FIG. 1.

The plug means 70 is provided for supporting one end of the pipe section 12 and as shown herein preferably comprises a substantially horizontally extending rotatable axle (not shown) journalled in a pilot block bearing or the like (not shown) secured to the pedestal 68 in any well known manner, and preferably as shown in my aforementioned U.S. Pat. No. 4,142,644. A pipe engaging plug 72 is secured to one end of the axle (not shown) for rotation simultaneously therewith, and a clutch element 74 is secured to the opposite end of the axle for rotation therwith, as will be hereinafter set forth in detail.

The pipe engaging plug means 72 is adapted for insertion within the open end of the pipe section 12, as shown in FIG. 1, and engages only the inner periphery of the pipe, thus precluding interference with the coating of the exterior of the pipe, and eliminating contact with the coating material subsequent to the application thereof to the pipe and prior to the complete curing of the coating material. In order to accomplish this, the plug means 72 as shown herein comprises a plate or disc member 76 bolted or otherwise secured to a complementary flange member 78 which is secured to one end of the axle (not shown) for rotation simultaneously therewith. A central core member 80 extends axially outwardly from the plate 76 and is provided with a plurality of circumferentially spaced radially extending pipe engaging elements or shoes 82. The outer or exposed edge of each shoe 82 is serrated or stair-stepped, as particularly shown at 84 in FIG. 1 in order that the pipe engaging means 72 may be utilized with a variety of diametric sizes of pipe sections 12. In addition, it may be preferable that each step of the edge 84 be of a tapered configuration whereby the shoes 82 may be securely wedged against the inner periphery of the pipe section 12 when the pipe section 12 is being supported by a pair of the vehicles 10 as will be hereinafter set forth.

It is also preferable to provide a plate or channel member 86 rigidly secured between the inboard channel members 18 and 20 for supporting a suitable winch (not shown) or the like. Suitable angular extending strengthening members 88 and 90 may be welded or otherwise rigidly secured between the channels 18 and 20 and the cross member 26, as particularly shown in FIG. 2 for added rigidly to the framework 14. In addition, a plate member 92 may be supported at the juncture between the cross member 26 and strengthening members 88 and 90 for supporting a winch or the like (not shown), if desired. It may be desirable to provide both winch supports 82 and 92 for each vehicle 10, or as a practical matter, it may be desirable to provide one-half the carts or vehicles 10 with the winch support 86 and the other half of the vehicles 10 with the winch support 92. The winches (not shown) are provided for facilitating return of the vehicles 10 to the initial pipe engaging area subsequent to the complete coating or other treatment of the pipe sections 12 transported thereby as is well known and as hereinbefore set forth.

One end of the complementary pair of channel members 16 and 18 is preferably canted or beveled as shown at 94 in FIG. 1, and the corresponding end of the complementary channels 18 and 20 is similarly beveled in order to preclude interference between two adjacent carts 10 during transportion of adjacent pipe sections 12 in end-to-end relation as will be hereinafter set forth. In addition, a latch apparatus generally indicated at 96 is provided on one sidewall 98 of the pedestal 68, preferably the sidewall facing the channel members 16 and 18, but not limited thereto. The latching apparatus comprises a first plate or bracket member 100 welded or otherwise rigidly secured to the sidewalls 98 and extending substantially perpendicularly outwardly therefrom, as shown in detail in FIG. 4 a second substantially identical bracket 101 is similarly secured to the opposite sidewall of the pedestal 66 and extends perpendicularly outward therefrom. A flange member 102 is welded or otherwise secured to the outwardly directed face of the plate or bracket 100 and extends perpendicularly outwardly therefrom in spaced substantially parallel planar alignment with the sidewall 98. A latch member 104 is pivotally secured to the flange 102 at 106, and is freely pivotal with respect to the flange.

The latch member 104 as shown herein is of a substantially L-shaped configuration and comprises an upper substantially straight shoulder 108 conterminous at 110 with an angularly extending shoulder 112. A notch 114 is provided in the angular shoulder 112 and in spaced relation with respect to the terminous 108 of the latch member 104. The notch 114 terminates in a second angularly extending shoulder 116, which in turn terminates in a stop member 118. The stop member 118 engages the outer periphery of the pedestal 68 and limits the pivotal movement of the latch member 104 in one direction, and a second stop member 120 is provided of the straight edge 108 for engagement with the pedestal 68 to limit the pivotal movement of the latch member 104 in an opposite direction. The construction and configuration of the latch member 104 is particularly selected whereby gravity constantly urges the latch member 104 in a counterclockwise direction about the pivot point 106 as viewed in FIG. 1.

Two of the carts or vehicles 10 are utilized in spaced relation for supporting a pipe section 12 between the respective pedestals 68 thereof. One of the vehicles travels along the rails 62 and 64 in the direction indicated by the arrow 24 in FIG. 2, and the other of the vehicles is disposed on the rails 62 and 64 in a reverse direction with respect to the other vehicle whereby the direction of travel thereof, although in the same direction of movement as the complementary vehicle, will appear to be in a reverse direction since the pedestal member 68 of the following vehicle will be disposed at the rear thereof whereas the pedestal 68 of the leading vehicle 10 will be at the front thereof. It will be readily apparent that the reverse arrangement between the cooperating vehicles 10 supporting a pipe section 12 therebetween which causes the pedestal 68 of the next succeeding pair of carts to be disposed in the proximity of the pedestal member 68 of the immediately preceding cart, thus positioning the latch apparatus 96 of a trailing cart in the proximity of the bracket member 101 of the leading cart of the next succeeding pair of carts, as well as positioning the clutch members 74 therein in a position for engagement upon latching of the two carts in connected position as will be hereinafter set forth.

In use, one vehicle 10 is disposed in the proximity of one end of the pipe section 12, such as the near or following end thereof, and a second vehicle 10 is disposed in the proximity of the opposite end of the pipe. As hereinbefore set forth, the relative position of the carts on the rails 62 and 64 is a reverse position with respect to each other whereby the plug means 72 of each vehicle pedestal 68 extends in a direction toward the plug means of the cooperating vehicle. The pipe plugs 72 may be inserted within the respective ends of the pipe section 12 as set forth in my aforementioned co-pending application Serial No. 820,581 for securely supporting the pipe section in a suspended position therebetween.

As the pipe section 12 mounted or carried by the complementary vehicles 10 is moved longitudinally in any well known manner, such as by the push roller means (not shown) set forth in my co-pending application Ser. No. 815,910, and simultaneously rotated about its own longitudinal axis in any suitable manner, such as by said push rollers, the cars or vehicles 10 roll freely along the rails 62 and 64, and the pipe supporting axles (not shown) of each cart 10 are rotated simultaneously with the pipe section. When a pair of adjacent tandem or linearly arranged pipe sections are moved in a position of substantial end-to-end abutment, the clutch 74 of the leading vehicle 10 is brought into engagement with the clutch element 74 of the trailing vehicle of the preceding pipe section in the assembly. The clutches are particularly designed for engagement when they are rotating in a common direction for transmitting rotation between the engaged clutch elements. Thus any rotation of one pipe section 12 is transmitted to the second pipe section. In addition, any longitudinal movement of one pipe section is also transmitted to the other pipe section by virtue of the engagement of the clutch elements of the cars 10.

In addition, the latching apparatus 96 of the following cart 10 of one pair of carts and the latching apparatus 96 of the leading cart 10 of the adjacent pair of carts will be moved into engagement with one another. The pivotal latch member 104 of one cart will engage the upper edge of the plate 101 of the adjacent cart, and the respective notches 114 of the latch member 104 will engage the plate 101 of the other latching apparatus, thus securely latching the carts 10 in tandem relation on the rails 62 and 64. The angular shoulder 112 of one latch member 104 will engage the plate 100 of the adjacent cart 10 and when the notch 114 is moved into substantial alignment with the upper edge of said plate 100, gravity will cause the latch to drop downwardly about the pivot point 106 for engaging the plate 100 with the notch 114.

In a pipe coating system as described and disclosed in my co-pending application Ser. No. 815,910, canted push rollers (not shown) are provided for engagement with the outer periphery of the pipe sections for transmitting both longitudinal and rotational movement to the pipe section engaged thereby. When a plurality of linear pipe sections are passing through the pipe coating system and through the push roller section thereof, the pipe sections which have previously moved through the push roller section are longitudinally and rotationally moved by the pipe sections disposed within the push roller section at any one time. The push rollers are preferably arranged so as to engage a single pipe section through a sufficiently great longitudinal distance as to engage the next succeeding pipe section prior to a complete disengagement from the first pipe section. In this manner, at least one pipe section in the string of succeeding pipe sections will always be driven in both a rotational and longitudinal direction by the push roller means. In addition, as a following pipe section approaches the immediately preceding pipe section, the rotational speed of the following pipe section will be brought up to substantially the same rotational speed of the preceding pipe section prior to the engagement between the respective clutch elements 74 of adjacent carts 10. It will be readily apparent that all of the pipe sections in the system which have at least reached the push roller section will be maintained in a longitudinally and rotationally moving procession.

When the pipe sections no longer require transporting by the vehicles 10, the plug means 72 may be removed from engagement with the inner periphery of the respective pipe sections as set forth in my prior U.S. Pat. No. 4,142,644, and the pipe sections may be removed from the vehicles in any well known manner (not shown), and the vehicles may be moved in a reverse direction in any suitable manner, such as by a winding operation, in order that they may be reused as required or desired.

It is preferable that the vehicles 10 not be self-powered. However, if desired, any suitable power source, such as a gasoline engine, or the like (not shown) may be provided for the vehicles. In addition, it may be desirable to provide all or some of the vehicles 10 with a suitable winch and line mechanism (not shown) as hereinbefore set forth for facilitating movement of the vehicles independently of the pipe sections.

From the foregoing, it will be apparent that the present invention provides a wheel cart or vehicle which may be utilized in reversely disposed pairs for supporting and moving linearly arranged objects in a manner whereby the vehicles may be interconnected in a latching relationship for facilitating a continuity of movement between the successive objects. The novel vehicles are simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. A wheeled vehicle for facilitating the transport of linearly arranged objects, said vehicle comprising main frame means, wheel means journalled on said frame means for moving said vehicle, pedestal means provided on said vehicle, object engaging and supporting means carried by the pedestal for receiving one end of the object, latching means provided on the vehicle for selective connection between a pair of adjacent substantially identical vehicles for coordinated operation between the said vehicles, and said wheel means comprising at least two pairs of axially aligned wheels with all wheels being in tracking position with respect to the other relatively positioned wheels, said latching means being carried by the pedestal means and cooperating with the latching means of said adjacent vehicle for a latching engagement in one relative position between the adjacent vehicles, said latching means comprising a bracket member rigidly secured to one outer wall of the pedestal means, flange means secured to the bracket member and disposed in spaced relation to the outer wall of the pedestal means, and a latch member pivotally secured to said flange means for selective engagement with the bracket member of the said adjacent vehicle for connecting the two vehicles in tandem relation.

2. A wheeled vehicle as set forth in claim 1 wherein the latch member is of a substantially L-shaped configuration, one leg of said L-shaped configuration being provided with a substantially straight edge, an angularly disposed edge conterminous with the straight edge for engagement with the bracket member of said adjacent vehicle, said angularly disposed edge being provided with a notch therein for receiving the bracket of the adjacent vehicle therein for latching the two vehicles in said tandem relation, and stop means provided on the pivotal latch member for limiting the pivotal movement therein in opposite direction.

3. A wheeled vehicle as set forth in claim 1 wherein two substantially identically oppositely disposed vehicles are arranged for supporting the object between the object engaging and supporting means thereof, and the latching means of said two adjacent vehicles cooperate for latching pairs of oppositely disposed vehicles in tandem relation whereby the object engaging and supporting means of the two adjacent vehicles are operably engaged during transporting of said linearly arranged objects.

* * * * *